United States Patent [19]
Seifert

[11] Patent Number: 4,702,533
[45] Date of Patent: Oct. 27, 1987

[54] METHOD AND DEVICE FOR STORING FLAT RECORDING MEDIA

[75] Inventor: Josef Seifert, Grosselfingen, Fed. Rep. of Germany

[73] Assignee: Kurz Kunstoffe GmbH, Haigerloch, Fed. Rep. of Germany

[21] Appl. No.: 852,648

[22] Filed: Apr. 16, 1986

[30] Foreign Application Priority Data

Apr. 16, 1985 [DE] Fed. Rep. of Germany ....... 3513606

[51] Int. Cl.⁴ .............................................. A47B 81/06
[52] U.S. Cl. ..................................... 312/12; 312/319; 312/348; 312/111; 206/387
[58] Field of Search ............... 206/504, 509, 511, 512, 206/387; 312/9–15, 319, 330 R, 348

[56] References Cited

U.S. PATENT DOCUMENTS

| | | | |
|---|---|---|---|
| 1,682,272 | 8/1928 | Frankenstein | 312/15 |
| 3,000,680 | 9/1961 | Zelenko | 206/512 X |
| 3,969,007 | 7/1976 | Lowry | 312/15 |
| 4,366,905 | 1/1983 | Forshee | 206/512 X |

Primary Examiner—Joseph Falk
Attorney, Agent, or Firm—Eugene E. Renz, Jr.

[57] ABSTRACT

A storage device for recording media comprising a housing having an open front and trays for the recording media positionable laterally into the housing. The sliding trays consist of the lower part of the original package having side edges which run between guide rails formed interiorly of the housing.

9 Claims, 6 Drawing Figures

METHOD AND DEVICE FOR STORING FLAT RECORDING MEDIA

FIELD OF THE INVENTION

The present invention to a system for storing flat recording media in sliding open-topped trays and to a storage device characterized by novel features of construction and arrangement.

BACKGROUND OF THE INVENTION

Recording media as referred to and used herein shall mean disk-shaped data information carriers, such as compact disks (CD's) and flat, magnetic data carriers and the like. Method and apparatus or devices for storing recording media, particularly for tape recording media in the form of cassettes are not new per se. However, in accordance with presently known methods and devices, the rather complicated and expensive original plastic package utilized for recording media, usually in the form of a cassette, must first be removed when it is desired to store the medium and then the cassette is placed in a tray of the storage device. Accordingly, apart from the fact that the original packaging with its original labeling and identification of contents is discarded and can no longer be used, it is also necessary to transfer the labeling and identification information for the cassette or the like in question to the storage tray in such a way that they are readily legible.

SUMMARY OF THE PRESENT INVENTION

With the foregoing in mind, it is a principal object of the present invention to reduce the cost of the method and devices for storing flat recording media and to simplify their use. This goal is achieved in accordance with the present invention by providing a system for storing recording media in sliding, open-topped trays which are slidably mounted in a housing and actuatable between a storage position within the housing and an outer position for removal of the recording media. In accordance with the present invention, the lower portion of the standard commercial original package of the recording media is utilized as the sliding tray after removal of the top thereof. The housing for these trays is provided with a number of open compartments extending so that the trays may be introduced laterally into the housing and wherein the side edges of the lower portions of the original package run between guide rails on the inside of the housing. By reason of this, it is possible not only to continue to use the essential part of the expensive original package with the exception of the relatively simple and inexpensive top cover for efficient storage in a storage device while retaining the portion of the original package which contains all the necessary information on the content of the recording medium such as title, author, interpreter, running time, etc. This information is usually provided on the front of the package and therefore, is visible in accordance with the system of the present invention when the package is used as a tray. Accordingly, this obviates the need for providing the trays with additional labeling or identification.

Accordingly, to implement the method and system of the present invention, it is simply necessary to provide a suitable housing having a series of lateral guide rails in which the lower portions of the original packages from which the tops have been removed are insertable as sliding trays. The trays nest one on top of the other and when it is desired to remove the contents from a given tray, it is simply pulled out and after use, the tray can be reinserted.

In accordance with other more specific features of the present invention, a locking lever for the tray may be provided which snaps automatically into place when the tray is in the inserted position, the lever being released by the pressure of the finger on an actuating element on the front of the housing and a spring device which on release slides the tray out. The locking lever can be pressed into a position wherein a retaining element rigidly connected to the locking lever snaps into a holding device. The retaining element may consist of a hook projecting outwardly from the locking lever which engages with a mating hook projecting inwardly from the housing.

The locking lever, its support and guide system and its particular springloading arrangement provide a simple and effective means for the locking and release of the trays. For example, the locking lever is supported by means of a compression spring in the housing and by this arrangement, it is possible simply by means of finger pressure on the actuating element situated on the forward end of the locking lever not only to release the tray but also at the same time to latch the retaining device for the locking lever in the release position. Additionally, pushing the tray completely in automatically displaces the locking lever slightly in the longitudinal direction against the force of the compression spring supported on the back end and in this way the retaining device is released so that the locking lever can again snap into place into the locking position. The locking lever is held in its release position preferably by being bent elastically and it snaps back automatically into the locking position when the retaining device is released which occurs when the tray is pushed all the way in.

The spring device for pushing the tray out can be designed either as an ejector leaf spring or as a knee lever. In either event, it is mounted on the back, inside wall of the housing and is formed as a single piece with a locking lever. Whereas the ejector leaf spring acts automatically when the tray is released, the knee lever is acted on by a helical compression spring supported in the housing transversely with respect to the direction in which the tray is ejected so that it can act on the tray when it is released.

In accordance with other more specific features of the invention, the locking lever may be injection molded together with the leaf spring and the ejector leaf spring or knee lever as a single, unitary piece of plastic which not only facilitates simple and economic production, but also makes the assembly and function of the cooperating parts convenient and reliable.

In accordance with still another feature of the present invention, it is possible to lock the tray in an intermediate position in the nature of a memory position wherein the slight projection of the tray beyond the front surface of the housing provides visual indicia that the recording medium for that tray has been removed. The mechanism locking in an intermediate position does not, of course, prevent the tray from being fully inserted at any time. However, in the intermediate position, the tray is locked and prevented from being pulled out any further.

The housing also includes means preventing the trays from falling out completely when the locking lever is released and are held in a removal position wherein the recording medium can be readily lifted out or removed. This is achieved by means of elastic stops mounted on the guide rails or on the locking levers. These stops function to hold the transverse rear edge of the tray. When the tray is inserted for the first time, however, these stops can slip elastically by the rear edge. It is advisable to design the guide rails in such a way that in the removal position, each tray tips by the force of gravity into a slightly inclined position so that it is easier to lift out the recording medium. This can be done very readily by providing recesses or projections on the guide rails.

In accordance with another feature of the present invention, the housing may be formed in plural parts which snap together to facilitate assembly of the overall storage device and make it easier to insert the locking levers and the parts associated therewith.

The storage devices are also designed for stacking one on top of the other and next to one another. To this end, suitable snap-in notches are provided on the exterior of the housing into which suitably designed tabs can be pressed. Tabs are connected by means of flexible film hinges to a similar tab designed as a mirror-image, which can be pressed into the snap notch of another housing. When two housings are connected next to each other in this way, the two tabs are in a stretched-out position, whereas when the housings are stacked on top of each other, the intermediate film hinge is bent 180°. In this way it is possible to attach several housings together with sufficient strength very easily and quickly and at very little production cost. The tabs consist preferably of an elastic type of plastic.

DESCRIPTION OF THE DRAWINGS

These and other objects of the present invention and the various features and details of the operation and construction thereof are herinafter more fully set forth with reference to the accompanying drawings, wherein.

DESCRIPTION OF THE PREFERRED EMBODIMENTS

Figure 1:
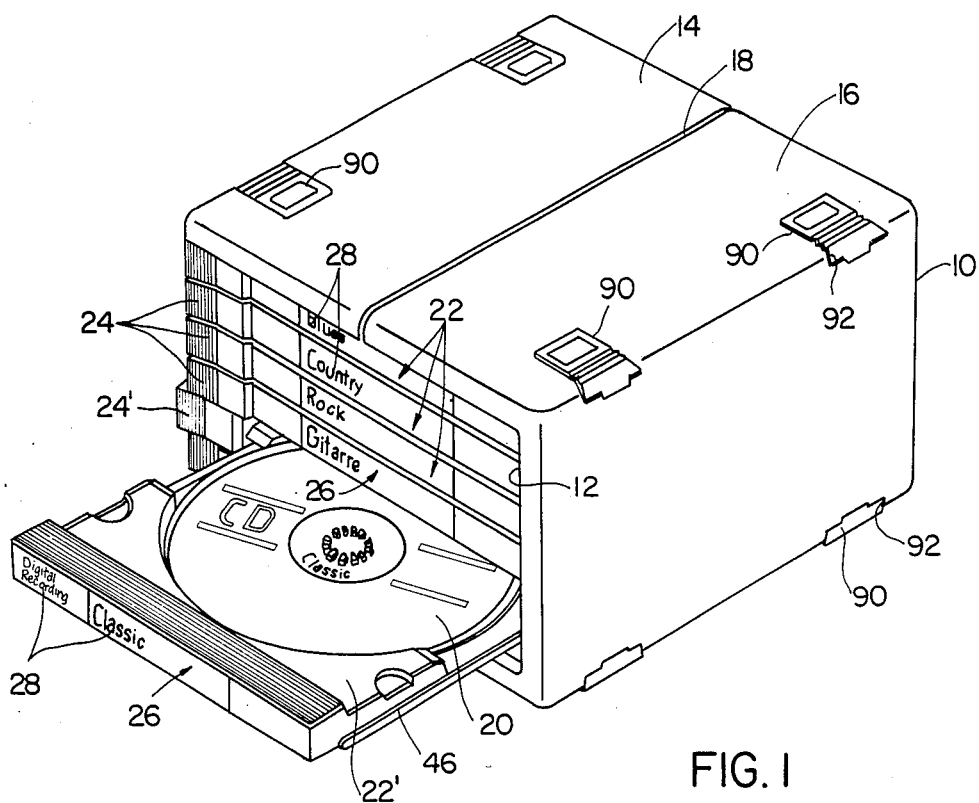
FIG. 1 is a perspective view of a storage device in accordance with the present invention with the lower package parts of compact disks as trays.
Figure 2:
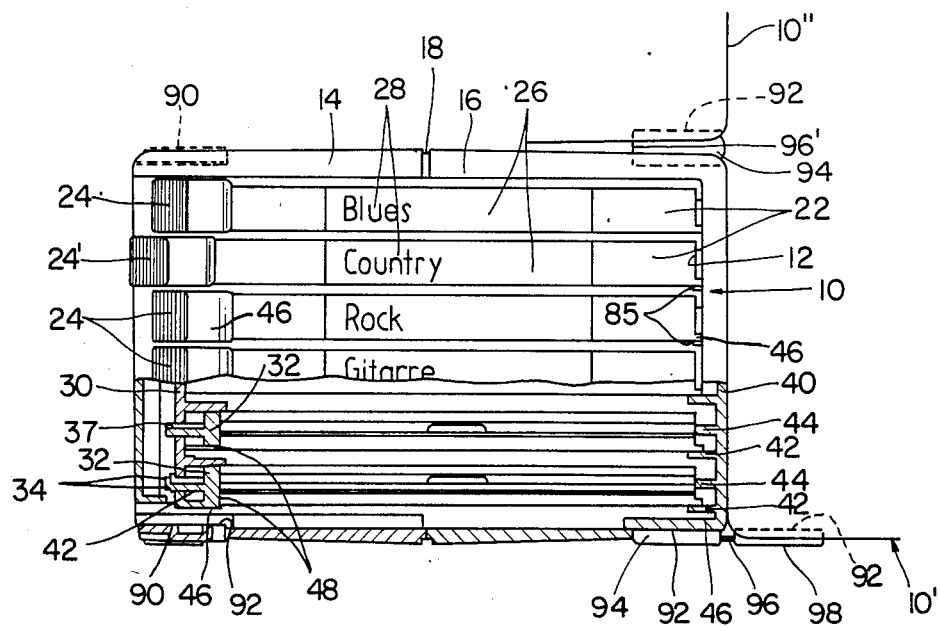
FIG. 2 shows a view of the front of the device shown in FIG. 1, partially cut away in the vertical direction.

Referring now to the drawings and particularly to FIGS. 1 and 2 thereof, there is shown a storage device constructed in accordance with the present invention which as illustrated includes a housing 10 of generally cubic form and which may be molded from a plastic material. The housing which has essentially an open front, as indicated at 12, consists, in the present instance, of two housing parts 14, 16 which are joined together by means of connecting strips 19 which snap elastically into each other along a joint 18 passing along the vertical central plane of the housing.

The bottom parts of the original packages of compact disks 20 are inserted flat into the open front side 12 of housing 10 as sliding trays 22, one of top of the other. By actuating an actuating element 24', this being shifted somewhat to the left with respect to the actuating elements 24 of the other trays, a tray 22' is automatically pushed out into the fully extended position, in which the compact disk 20 can be conveniently lifted out. The front sides 26 of the bottom parts of the packages forming trays 22, 22' are provided in the conventional way with the information 28 on the content of the compact disk.

Figure 4:
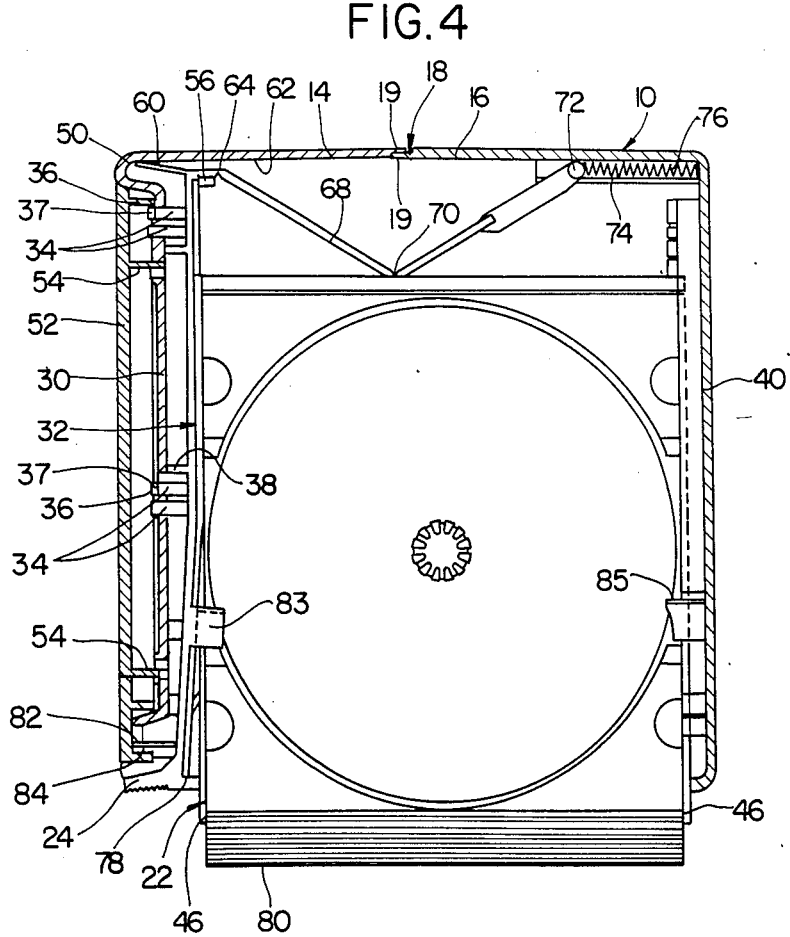
FIG. 4 shows a horizontal section along line IV—IV of FIG. 3.

It can be seen from FIG. 4 that, along one side wall 30 of housing 10, between the wall and the tray 22, there is a long locking lever 32 of elastic material, preferably plastic, which extends for the entire depth of housing 10 starting from actuating element 24; this lever has guide pins 34 projecting laterally from it which engage with short guide slots 36 in side wall 30. From FIG. 2 it can be seen that guide pins 34 are provided with hooks 37, which engage behind side wall 30 and thus support locking lever 32 so that it is free to slide in guide slots 36 parallel to side wall 30. On the inside of side wall 30, locking lever 32 is supported by crosspieces 38 on which it slides.

It should be mentioned that all parts of the design which are the same or similar in the various levels of the storage device are provided with the same reference numbers.

Figure 3:
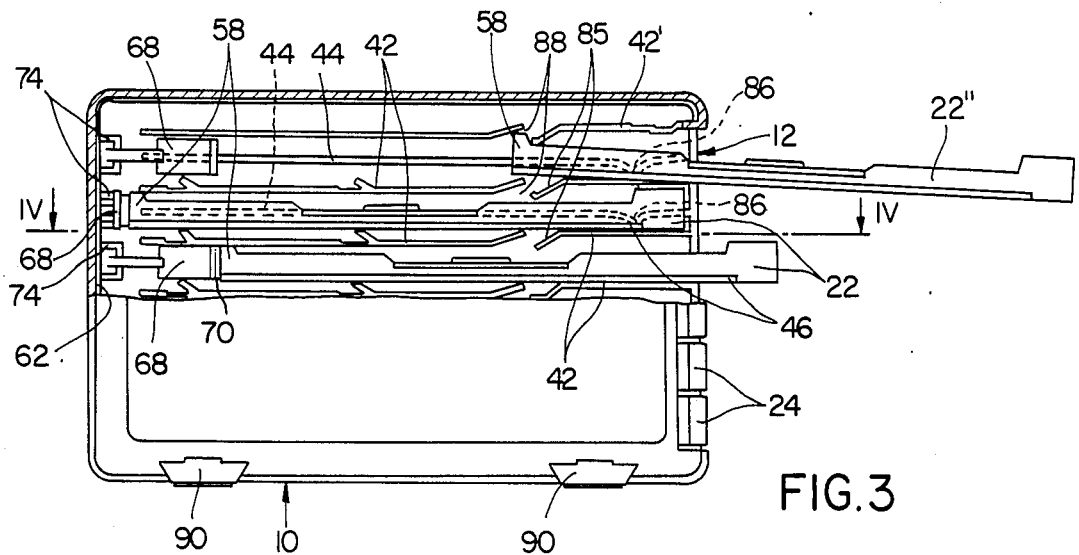
FIG. 3 shows a side view of the device shown in FIG. 1, the housing being partially cut away.

FIGS. 2 and 3 show that the edges of the underside of trays 22 are supported by and slide on lower guide rails 42, which project inward from side walls 30 and 40 of housing 10. Lateral guidance for trays 22 is provided by locking lever 32 and also by upper guide rails 44 which project inward from side wall 40 between lower guide rails 42. Apron support strips 46 extending outward from the lower edges of trays 22 project on one side into a corresponding recess 48 in locking lever 32 and on the other side between the lower and upper guide strips 42, 44.

As can be seen from FIGS. 2 and 4, side wall 30 on the left, as seen from the front, is set in somewhat from outer edge 50 of housing 10, and an outer wall 52 flush with the housing is attached by snap-in crosspieces 54 to side wall 30, so that hooks 37 of guide pins 34 engaging with slots 36 can move in the gap between side wall 30 and outer wall 52 and are thus covered from the outside.

Each actuating lever 32 is provided at its back end with a stop 56 for the rear edge 58 of the associated tray 22. An integral plastic leaf spring 60 projects from stop 56 at a slant toward the outside and the rear; this spring is supported on rear inside wall 62 of the housing. Also integral, a knee lever 68 is connected to stop 56 by means of a flexible, thinned-down hinge part 64; the two shanks of the lever are also connected by means of a thinned-down, flexible hinge part 70. The opposite end of knee lever 68 is provided with a pin 72, which is free to slide in the gap between rear inside wall 62 and a guide shaft 74 extending parallel to that wall. Pin 72 is subject to the force, exerted transversely with respect to the direction in which the tray is ejected, of a helical compression spring 76 held between inside wall 62 and guide wall 74.

Figure 5:
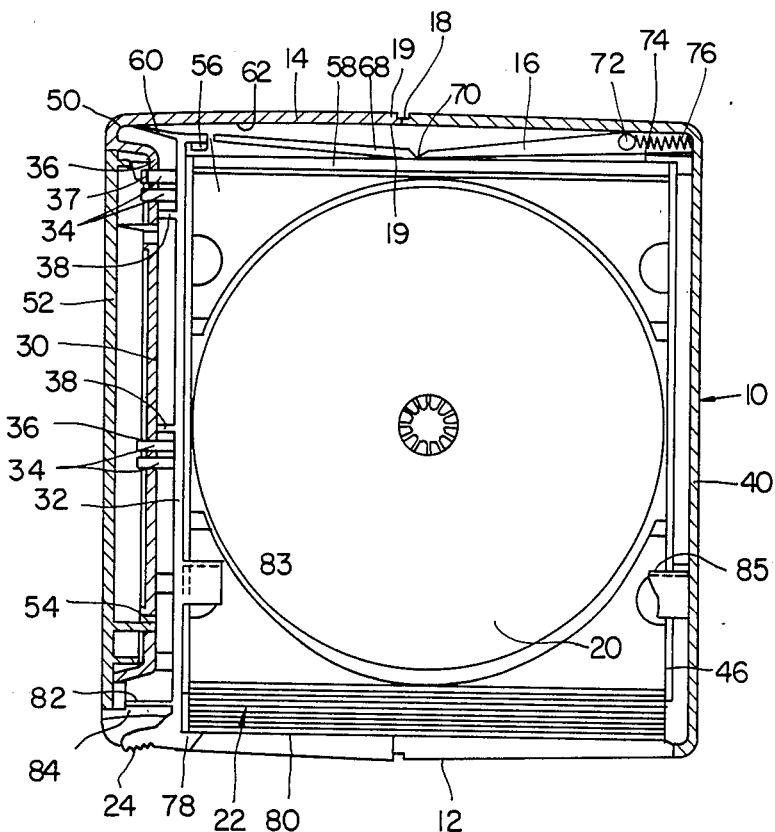
FIG. 5 shows a section corresponding to FIG. 4 with a completely inserted tray.

As can be seen from FIG. 5, locking lever 32 in its normal position rests laterally against the completely inserted tray 22, and a locking projection 78 engages with front edge 80 of the tray, by which means the tray is locked in placed and prevented from moving outward. When actuating element 24 on the forward end of locking lever 32 is actuated, the element is pulled slightly outward together with the forward end of the actuating lever, until locking projection 78 releases front edge 80. At this moment, a hook 82 projecting outward from the forward end of locking lever 32 snaps into a mating hook 84. This hook is rigidly connected to the housing, projects inward from the housing, and forms a retaining device for the forward section of locking lever 32. In this way, locking lever 32 is held temporarily in the unlocked position. The forward-directed force exerted on locking lever 32 required for hook 82 to snap firmly into mating hook 84 is provided by leaf spring 60 supported on rear inside wall 62.

When locking lever 32 is held in its unlocked position, tray 22 is released for its outward movement. At this moment, knee lever 68 with its bend 70 in contact with rear edge 58 of tray 22 is subjected to the force of helical compression spring 76 and flexes outward until it reaches approximately the position shown in FIG. 4. As a result of this outward flexing movement of knee lever 68, tray 22 is pushed out far enough so that it can be gripped by the hand and pulled out completely into the completely extended position as shown by trans 22' in FIG. 1 or tray 22" in FIG. 3. In this fully extended position, rear edge 58 of each tray 22 comes to rest against stops 83, 85, which project inward and down at a slant on one side from locking lever 32 and on the other side from lower guide rail 42 situated above the tray. Above the uppermost tray 22" there is an additional lower guide rail 42', on which no additional 22 tray slides. When a tray 22 is slid for the first time into housing 10, stops 83, 85 give way elastically as rear edge 58 passes by, whereas they spread to prevent rear edge 58 from being pulled out.

To provide guidance on the top side to apron stop strips 46 projecting laterally from the lower edge of each tray 22, i.e., guidance on the side opposite locking lever 32, upper guide rails 44 have at their forward end a bent saddle 86 facing downward, the top of which makes sliding contact with apron stop strips 46. As a result of the configuration of these saddles 86 and a raised area 88 on lower guide rails 42 situated above, into which rear edge 58 can extend upward, the weight of the projecting section of tray 22 results in the slightly downward-tipped position shown in FIG. 3 for tray 22", in which position the removal of compact disk 20 is made easier.

Figure 6:
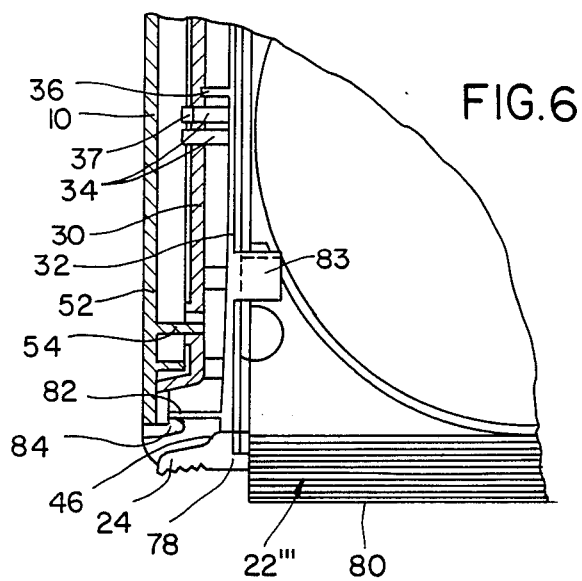
FIG. 6 shows a partial section corresponding to FIGS. 4 and 5 with a tray in its memory position.

After the compact disk has been removed for use, the empty tray can be pushed into position 22''' according to FIG. 6, in which it is again subject to the force of knee lever 68. When in this position, however, locking projection 78 of locking lever 32 engages with the forward end of the apron stop strip 46 and thus locks tray 22''' in this memory position extending slightly out from front side 12 of housing 10, by means of which the user is minded from which tray he has taken the compact disk. To insert the compact disk, actuating element 24 is again pushed outward, and tray 22 is slid completely out. After compact disk 20 has been laid in the tray, tray 22 is pressed back into the fully inserted position according to FIG. 5. By the contact of rear edge 58 against stop 46 of locking lever 32, the lever is pushed slightly backward against the force of leaf spring 60, so that hook 82 is released by its mating hook 84, and the front sectin of locking lever 32 snaps into the locking position according to FIG. 5 by virtue of its intrinsic elasticity, in which position locking projections 78 engages with the front edge 80 of tray 22.

On the outside of the housing, near the corners, snap-in parts 90 made of an elastic plastic are snapped into slightly undercut notches 92 in the housing. These snap-in parts 90 can serve on the bottom as feet on which the housing can rest. Snap-in tabs 90 are easy to remove by hand from notches 92 and can then be easily replaced by snap-in tabs 94 which fit into notches 92 as shown in FIG. 2. Tabs 94 are also made of plastic and are connected by way of a flexible film hinge 96 to a similar, second tab 98 designed as a mirror image of the first. This tab 98 can be snapped into a corresponding notch 92 of a housing placed next to housing 10 or, when film hinge 96' is bent 180°, into notch 92 of a housing 10" on top of housing 10. By means of these double tabs, it is possible to ensure a quite stable assembly of several similar housings next to and on top of one another.

While particular embodiments of the present invention have been illustrated and described herein, it is not intended to limit the invention and changes and modifications be made therein within the scope of the following claims.

SUMMARY

The invention makes it possible to use the original packaging of flat, preferably disk-shaped recording media as sliding trays in a common storage housing. Simple and easy-to-mount locking and ejection devices for these sliding trays are described.

What is claimed is:

1. A system for storing flat recording media in sliding, open-top trays which can be slid into pockets in a housing and pulled out to a position for removal of the recording media, comprising:

a plurality of sliding trays including a lower portion of a standard package for recording media and having a front edge and a rear edge, said package having its top removed;

a housing having a plurality of open compartments extending to receive trays laterally therein, and having lateral guide rails for each tray on the inside of said housing, said housing including biasing means at the back of said housing for applying a bias on said trays when said trays are fully inserted;

locking lever means including a locking lever extending along one side of each of said compartments, said lever contacting said biasing means at the back of said housing and having a locking projection for restraining the front edge of said tray against said biasing means when said tray is fully inserted;

actuating means attached to said locking projection of said lever for releasing said tray by movement of said actuating means toward said side of said housing, said housing and said lever having cooperative hook means for holding said lever in an unlocked position upon movement of said lever toward said side of said housing; and stop means on the back edge of said lever, said stop means being positioned to engage the rear edge of said tray when said tray is fully inserted to move said lever to disengage said hook means and permit said locking projection to restrain said tray in a fully inserted position.

2. A storage device according to claim 1, wherein the locking lever (32) has guide pins (34), which slide in guide slots (36) in the housing (10), said slots permitting a small amount of lengthwise movement of the locking lever (32) with respect to the housing (10).

3. A storage device according to claim 1, wherein the compression spring (60) is designed as a leaf spring forming a single unit with the locking lever (32).

4. A storage device according to claim 1, including a spring device for pushing out the individual trays (22), said spring designed as an ejector leaf spring which forms a single unit with the locking lever (32) and is supported on the rear inside wall (62) of the housing (10).

5. A storage device according to claim 4, wherein locking lever (32), leaf spring (60), and ejector leaf spring form a single plastic part.

6. A storage device according to claim 1, including elastic stops (83, 85) projecting inwardly and downwardly from the forward section of the guide rail (42) and the locking lever (32) above each tray (22), and wherein the rear edge (58) of the tray (22) comes to rest against these stops as the tray slides out, the elasticity of these stops allowing this same edge to slip by the first time the tray (22) is inserted.

7. A storage device according to claim 15, wherein each tray (22) can be tipped by gravity into a slightly tilted position after it has been slid out into a position in which the rear edge (58) of the tray (22) is in contact with the stops (83, 85).

8. A storage device according to claim 1, wherein the housing (10) consists of two housing parts (14, 16) connected along a joint (18), connecting strips (19) which snap elastically into each other being provided at the joints (18).

9. A storage device according to claim 1, including snap-in notches 92 on the outside of the housing (10), near its edges and a first tab (94) can be snapped by pressure into said notches (92), said first tab being connected by means of a flexible film hinge (96) to a similar tab (98) designed as a mirror image of the first.

* * * * *